Figure 1:
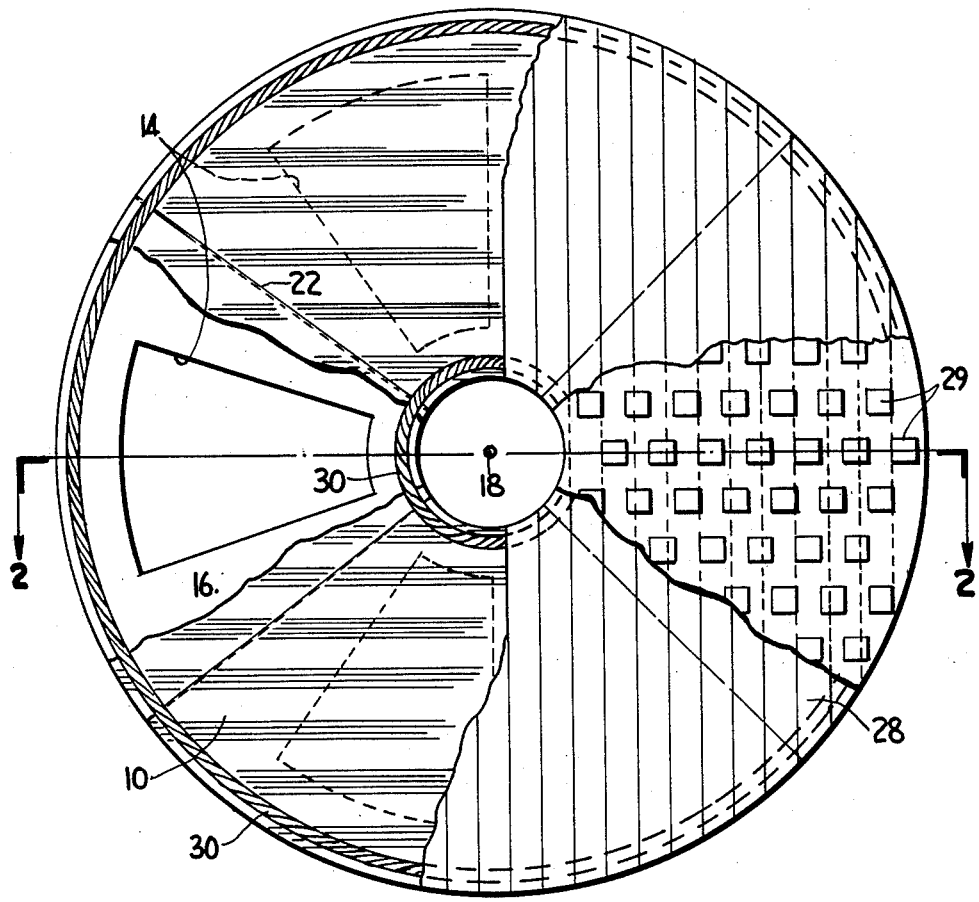

Feb. 18, 1964        F. C. FYE        3,121,299

GLASS GRINDING RUNNER

Filed July 19, 1962

INVENTOR.
FRED C. FYE

BY Oscar L. Spencer
ATTORNEY

United States Patent Office 3,121,299
Patented Feb. 18, 1964

3,121,299
GLASS GRINDING RUNNER
Fred C. Fye, Natrona Heights, Pa., assignor to Pittsburgh Plate Glass Company, Pittsburgh, Pa., a corporation of Pennsylvania
Filed July 19, 1962, Ser. No. 211,029
2 Claims. (Cl. 51—209)

This invention relates to the surfacing of glass and more particularly to the construction of a grinding runner for use in grinding rough rolled plate glass. In the process of grinding rough rolled plate glass, sheets of rough rolled plate glass are laid on tables which are conveyed on tracks beneath horizontally disposed rotatable runners to which is fed a slurry of sand and water. The combination of runner and slurry abrades the surface of the glass and produces a substantially plane surface. The sheet is then polished on the ground side, after which it is turned over for grinding and polishing on the reverse side.

The present invention comprises a glass grinding runner constructed of a substantially circular grinding runner block connected to a rotatable shaft driven by a suitable prime mover, such as an electric motor, a layer of impermeable sheet material, such as water-proofed paper, secured to the underside of the runner block, wood planking substantially conforming to the circular shape of the runner block and attached thereto through the impermeable sheet material, and glass grinding runner bars constructed of cast iron attached to the wood planking.

In practice, the large, circular grinding runner blocks are manufactured with cavities opening to their underside surface to provide the desired rigidity with reduced mass. Prior to the present invention, it was found that even though the runner blocks were balanced prior to use, sand, glass chips, and other materials from the grinding slurry tended to accumulate in these cavities, causing an unbalance of the grinding runner blocks. Unbalanced grinder runners produce severe defects, such as sweeping ridges, in the surface of the glass being ground.

In an effort to alleviate this problem the cavities were heretofore filled with plaster. In due time, however, the plaster would break and shift within its cavity, again causing the grinding runner to become unbalanced.

In accordance with the present invention, a sheet of impermeable material is inserted between the runner block and the wood planking, sealing the cavity, so that unwanted material cannot enter same, and thereby alleviating the problems heretofore encountered when using runner blocks of the described construction.

Reference is made to the drawing accompanying the specification wherein like reference numerals refer to like parts.

Figure 2:
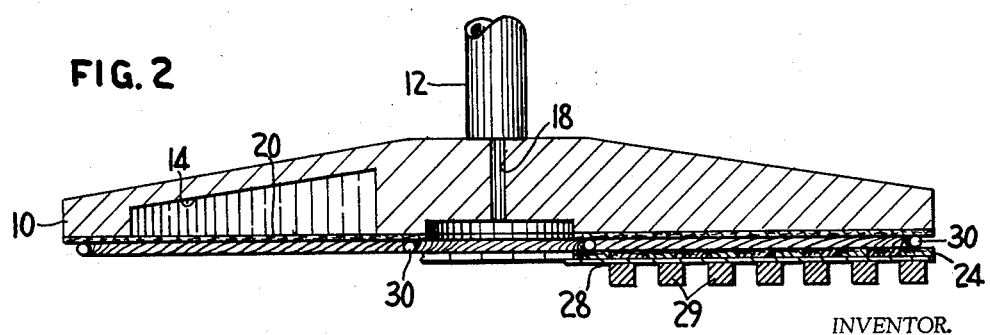

FIG. 1 is a plan view of the grinding runner of the present invention with parts broken away; and FIG. 2 is a sectional view of the grinding runner depicted in FIG. 1 taken on line 2—2 of FIG. 1.

A runner block 10 is a delicately balanced cast iron member rigidly attached to a rotatable shaft 12. In use rough rolled glass sheets are supported on tables, the supporting surface of which is horizontally positioned, which are conveyed on tracks beneath a plurality of such grinding runners each driven by a suitable motor. The shafts 12 are vertically aligned. As will be noted, the runner block is cast for maximum strength without undue weight. Thus, the underside of the block has cavities 14 therein separated from one another by webs 16. The cavities may occupy on the order of 60 percent of the volume of the block. A slurry of sand and water or other grinding material is introduced through the center of the rotatable shaft 12 and thence to the bottom of the block through its center by means of a passageway 18.

To seal each cavity 14 against the entrance of foreign matter which will cause an unbalance of the runner, sections or sheets of impermeable material, such as waterproofed paper, oil paper, or the like 20, are stretched across the respective cavities 14, so as to cover the cavities. If sections of material are used, as opposed to full sheets of material, they overlap at joints 22. Wood planking 24, such as oak or other hard wood, is then attached to the runner block by bolts (not shown). The wood planking serves as a convenient base to which cast iron runner block assemblies 28 having nogs 29 thereon are easily secured. Generally, the cast iron runner block assemblies 28 are manufactured in pie-shaped sections and are screwed to the planking 24. Preferably, instead of providing direct contact of the wood planking and the impermeable sheet material 20, a rim of oakum 30, a fibrous squashable sealing material, is placed therebetween. The oakum 30 is placed around the outer periphery of the runner block and its inner periphery surrounding the passageway 18 through which the grinding media is introduced.

The construction just described effectively seals each cavity against entrance of foreign matter thereinto, and eliminates the described cause of runner unbalance. It does not materially affect the weight of the runner because the only addition to conventional runners is the sheet of impermeable material 20. The product produced, i.e., ground glass—a smooth—is thus protected against the introduction of the described runner defects produced in the absence of this construction.

I claim:

1. A glass grinding runner including a runner block having at least one cavity therein opening to its underside, a sheet of impermeable material covering said cavity and sealing said cavity, a wood member secured to said block and separated therefrom by said sheet material, and runner bars connected to said wood member.

2. A glass grinding runner including a runner block having at least one cavity therein opening to its underside, a sheet of impermeable material covering said cavity and sealing said cavity, squeezable sealing material about the periphery of said sheet material, a wood member secured to said block and separated therefrom by said sheet material and said sealing material, and runner bars connected to said wood member.

References Cited in the file of this patent
UNITED STATES PATENTS

| | | |
|---|---|---|
| 1,101,046 | Valentine | June 23, 1914 |
| 1,805,254 | Osborn | May 12, 1931 |
| 1,856,173 | Stahle | May 3, 1932 |
| 1,860,117 | Pedersen et al. | May 24, 1932 |
| 2,164,418 | Monnet | July 4, 1939 |
| 2,776,527 | Hoyet et al. | Jan. 8, 1957 |